United States Patent
Nicol, II et al.

(10) Patent No.: US 8,659,623 B2
(45) Date of Patent: Feb. 25, 2014

(54) THREE-DIMENSIONAL (3D) VIRTUAL WORLD WORMHOLES

(75) Inventors: Wiliam B. Nicol, II, Durham, NC (US); Brian R. Bokor, Raleigh, NC (US); Andrew B. Smith, Morrisville, NC (US); Daniel E. House, Raleigh, NC (US); Peter F. Haggar, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 1068 days.

(21) Appl. No.: 12/109,553

(22) Filed: Apr. 25, 2008

(65) Prior Publication Data
US 2009/0267938 A1    Oct. 29, 2009

(51) Int. Cl.
*G09G 5/00* (2006.01)
*G09G 5/14* (2006.01)
*G06T 19/00* (2011.01)
*G06T 17/20* (2006.01)
*G06T 15/40* (2011.01)

(52) U.S. Cl.
CPC *G09G 5/14* (2013.01); *G06T 19/00* (2013.01); *G06T 17/20* (2013.01); *G06T 15/40* (2013.01); *G06T 19/006* (2013.01)
USPC ........... 345/633; 345/634; 345/419; 345/420; 345/421; 345/422; 345/423; 345/424; 345/426; 345/427; 345/473; 345/474; 345/475; 463/42; 715/205; 715/733; 715/745; 715/757; 709/204; 709/217

(58) Field of Classification Search
CPC .......... G06T 19/00; G06T 17/20; G06T 15/40
USPC ................ 345/419–427, 473–474, 633–634; 709/204–217; 715/114, 205, 706, 733, 715/745, 757; 705/14.66–14.73; 463/42
See application file for complete search history.

(56) References Cited

U.S. PATENT DOCUMENTS

| | | | |
|---|---|---|---|
| 6,175,842 B1 * | 1/2001 | Kirk et al. ................ 715/205 |
| 6,219,045 B1 * | 4/2001 | Leahy et al. ............ 715/757 |
| 7,809,789 B2 * | 10/2010 | Shuster .................. 709/203 |
| 8,276,071 B2 * | 9/2012 | Shuster et al. .......... 715/706 |
| 2001/0018667 A1 * | 8/2001 | Kim ......................... 705/14 |
| 2004/0210634 A1 * | 10/2004 | Ferrer et al. ............ 709/204 |
| 2005/0086605 A1 * | 4/2005 | Ferrer et al. ............ 715/745 |
| 2005/0266925 A1 * | 12/2005 | Hornell et al. ........... 463/42 |
| 2006/0046699 A1 * | 3/2006 | Guyot et al. ........... 455/414.1 |
| 2007/0050716 A1 * | 3/2007 | Leahy et al. ............ 715/706 |
| 2007/0063999 A1 * | 3/2007 | Park ...................... 345/419 |
| 2008/0081701 A1 * | 4/2008 | Shuster .................. 463/42 |
| 2008/0134056 A1 * | 6/2008 | Shuster .................. 715/757 |
| 2008/0158232 A1 * | 7/2008 | Shuster .................. 345/474 |
| 2009/0109223 A1 * | 4/2009 | Schalla et al. .......... 345/427 |
| 2009/0125481 A1 * | 5/2009 | Mendes da Costa et al. ..... 707/3 |
| 2009/0144638 A1 * | 6/2009 | Haggar et al. .......... 715/757 |
| 2009/0254968 A1 * | 10/2009 | Bussani et al. ......... 726/1 |
| 2010/0070859 A1 * | 3/2010 | Shuster et al. .......... 715/706 |

* cited by examiner

*Primary Examiner* — Jin-Cheng Wang
(74) *Attorney, Agent, or Firm* — Moore & Van Allen PLLC

(57) ABSTRACT

A three dimensional (3D) virtual world wormhole includes hosting a 3D virtual world, and creating a wormhole at a selected location in the 3D virtual world for automatic transport of an avatar from the selected location to a selected destination in the 3D virtual world. Policies may be defined for the wormhole where the wormhole operates in accordance with the defined policies. An avatar may be automatically transported from the location to any one of a plurality of destinations based on a current capacity of each of the plurality of destinations.

24 Claims, 8 Drawing Sheets

THREE-DIMENSIONAL (3D) VIRTUAL WORLD WORMHOLES

BACKGROUND OF THE INVENTION

The present invention is related to virtual worlds, and more specifically to three dimensional (3D) virtual world wormholes.

One feature of 3D virtual worlds is the ability an avatar to transport from place to place. Today in a virtual world one can walk, fly or teleport to a new destination. In some instances scripts can be written that enable an avatar to jump to a specific location. However, it is difficult to provide convenient linkages between points within a virtual world that consist of unique user defined policies. Tasks such as group teleport, sharing of landmarks (destination bookmarks), and direct linkages between locations are difficult and hard to manage.

BRIEF SUMMARY OF THE INVENTION

According to one aspect of the present invention, a method for a three dimensional (3D) virtual world wormhole that includes hosting a 3D virtual world, and creating a wormhole at a selected location in the 3D virtual world for automatic transport of an avatar from the selected location to a selected destination in the 3D virtual world.

According to another aspect of the present invention, a system for a three dimensional (3D) virtual world wormhole that includes a server, and a network interface that couples the server to a workstation, wherein the server hosts a virtual world allowing a user at the workstation to control an avatar in the virtual world to select a location in the virtual world, select a destination in the virtual world, and create a wormhole at the location for automatic transport of the avatar from the location to the destination.

According to a further aspect of the present invention, a computer program product comprising a computer useable medium having computer useable program code embodied therewith, the computer useable program code comprising computer useable program code configured to run a three-dimensional (3D) virtual world, and computer useable program code configured to create a wormhole at a selected location in the 3D virtual world for automatic transport of an avatar from the location to a selected destination in the 3D virtual world.

BRIEF DESCRIPTION OF THE DRAWINGS

The present invention is further described in the detailed description which follows in reference to the noted plurality of drawings by way of non-limiting examples of embodiments of the present invention in which like reference numerals represent similar parts throughout the several views of the drawings and wherein.

DETAILED DESCRIPTION OF THE INVENTION

Figure 1:
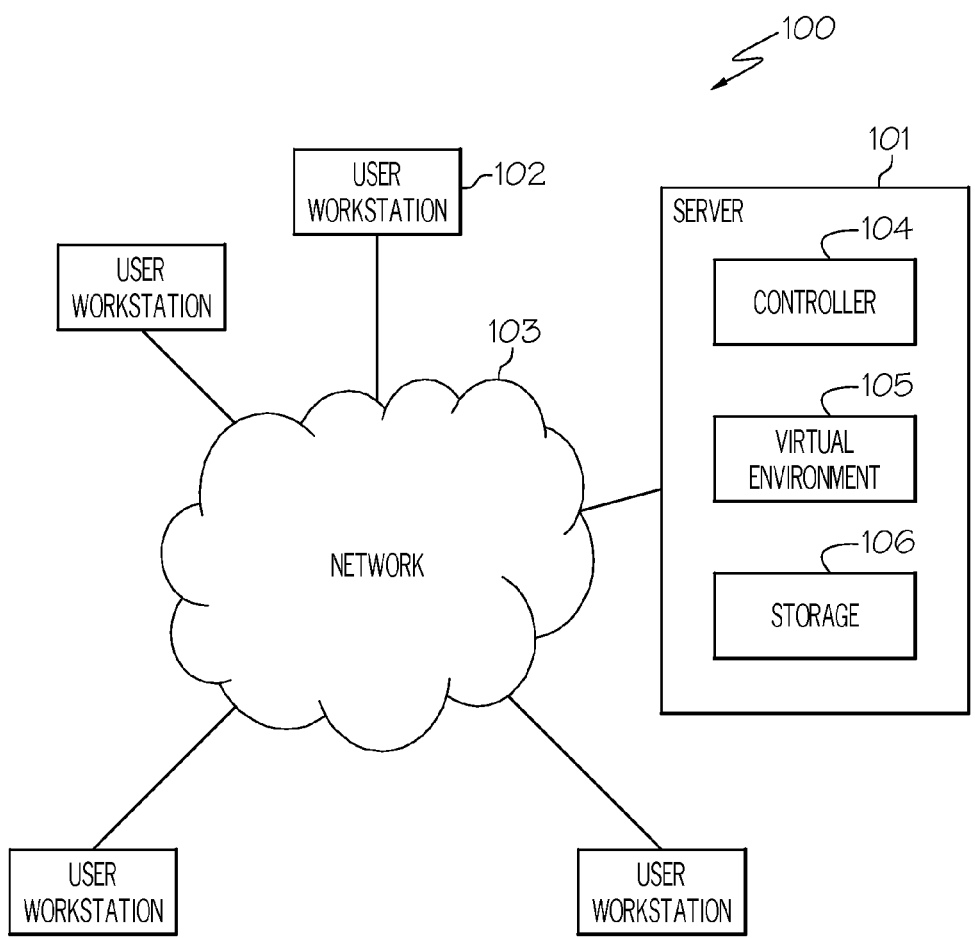
FIG. 1 is a diagram of a system for creating a three-dimensional virtual world wormhole according to an example embodiment of the present invention.

As will be appreciated by one of skill in the art, the present invention may be embodied as a method, system, computer program product, or a combination of the foregoing. Accordingly, the present invention may take the form of an entirely hardware embodiment, an entirely software embodiment (including firmware, resident software, micro-code, etc.) or an embodiment combining software and hardware aspects that may generally be referred to herein as a "system." Furthermore, the present invention may take the form of a computer program product on a computer-usable storage medium having computer-usable program code embodied in the medium.

Any suitable computer usable or computer readable medium may be utilized. The computer usable or computer readable medium may be, for example but not limited to, an electronic, magnetic, optical, electromagnetic, infrared, or semiconductor system, apparatus, device, or propagation medium. More specific examples (a non-exhaustive list) of the computer readable medium would include the following: an electrical connection having one or more wires; a tangible medium such as a portable computer diskette, a hard disk, a random access memory (RAM), a read-only memory (ROM), an erasable programmable read-only memory (EPROM or Flash memory), a compact disc read-only memory (CD-ROM), or other tangible optical or magnetic storage device; or transmission media such as those supporting the Internet or an intranet. Note that the computer usable or computer readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the context of this document, a computer usable or computer readable medium may be any medium that can contain or store the program for use by or in connection with the instruction execution system, platform, apparatus, or device.

Computer program code for carrying out operations of the present invention may be written in an object oriented, scripted or unscripted programming language such as Java, Perl, Smalltalk, C++ or the like. However, the computer program code for carrying out operations of the present invention may also be written in conventional procedural programming languages, such as the "C" programming language or similar programming languages.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operations to be performed on the computer or other programmable apparatus to produce a computer implemented process such that the instructions which execute on the computer or other programmable apparatus provide steps for implementing the functions/acts specified in the flowchart and/or block diagram block or blocks. Alternatively, computer program implemented steps or acts may be combined with operator or human implemented steps or acts in order to carry out an embodiment of the invention.

Embodiments according to the present invention enable an avatar in a virtual world to create a direct link between any two locations in the virtual world via a wormhole. The wormhole may be created at any time by an avatar and enables a portal between locations in a three-dimensional (3D) virtual world. As an avatar walks through the wormhole, the avatar may be automatically transported to another location in the virtual world. Moreover, an avatar may have the ability to define the life cycle and other characteristics of the wormhole such as, for example, how long the wormhole will last, criteria for which avatars may go through the wormhole, whether the wormhole is a one-way wormhole or a two-way wormhole, etc. These life cycle and other wormhole characteristics may be defined by policies created by the avatar for the wormhole.

In embodiments according to the present invention, an avatar in a virtual world may be controlled by a user to create a wormhole. For example, an avatar may be controlled to right click on a section of ground and be provided with an option to create a wormhole. A map may appear and the avatar may choose a wormhole destination thereby causing the wormhole to appear on the ground. Any other avatars that walk through the wormhole may be automatically transported to the chosen destination. Further, in embodiments according to the present invention, a wormhole may have a timer and be destroyed as soon as the creator of the wormhole walks through, or may be a permanent wormhole and be governed by parameters that the creator (e.g., avatar) sets upon creation of the wormhole. For example, the creator of the wormhole may define policy management criteria for the wormhole such as, for example, defining a criteria where the wormhole is only valid for specific identified avatars, a parameter where the wormhole is password protected, a wormhole policy where only avatars that are members of a specific group are allowed to enter, a time limit on the active life of the wormhole, etc. Moreover, a policy may be set for a wormhole where avatars attempting to enter the wormhole are scanned to identify any items that the avatar may be carrying that are not allowed or permitted at the destination of the wormhole. For example, if weapons are not permitted at the destination of the wormhole, the wormhole may scan an inventory of the avatar to determine if the avatar owns any weapons and if any of the weapons are missing from the avatar's inventory thus possibly being carried by the avatar. The avatar may then not be transported by the wormhole.

In exemplary embodiments of the present invention, one may create an advertising opportunity by creating a wormhole with a sign or other advertising material near a common place inviting avatars to step into the wormhole to be immediately transferred to a specific business or store. Further, wormholes may be created where several locations, for example, classrooms, demo stations, etc., each with a one way wormhole, could connect different points within a "tour". Further, according to embodiments of the present invention, a wormhole may be created that takes on various shapes and appearances. For example, a wormhole may be created that visually represents a store front with doors, windows, etc. that transports an avatar directly to the store in the virtual world. In this regard, a server hosting the virtual store may check a capacity available at the store and notify a store owner when a capacity is reached allowing the store owner to create a wormhole that may automatically transport an avatar to a different store location (i.e., hosted on a different server) via another wormhole that appears to look like a store front of the store. Alternatively, the wormhole may have access to the different store fronts and capacity of each and automatically transport an avatar entering the wormhole to a destination store with available capacity.

FIG. 1 shows a diagram of system for creating a three-dimensional virtual world wormhole according to an example embodiment of the present invention. The system 100 may include a server 101 and one or more workstations 102 where the server 101 and the one or more workstations 102 may be interconnected to a network 103. Although one server 101 is shown, there may be multiple servers connected to the network 103 via a network interface and accessible by the one or more workstations 102. The server 101 may host the virtual environment 105 and also contain a controller 104 and storage 106. Therefore, a user at a workstation 102 may access the virtual environment 105 hosted on the server 101 and control an avatar in the virtual environment 105 to create a wormhole with associated policies in the virtual environment (world). Further, other users may use the one or more workstations 102 to control other avatars to enter the created wormhole. Therefore, a user at a workstation 102 coupled to the server 101 via the network interface may control the avatar in the virtual world 105 to select a location in the virtual world 105, select a destination in the virtual world 105, and create a wormhole at the location for automatic transport of the avatar from the location to the destination. The server 101 may include software or applications for running the hosted a 3D virtual world and creating a wormhole at a selected location in the 3D virtual world for automatic transport of an avatar from the selected location to a selected destination in the 3D virtual world.

Figure 2:
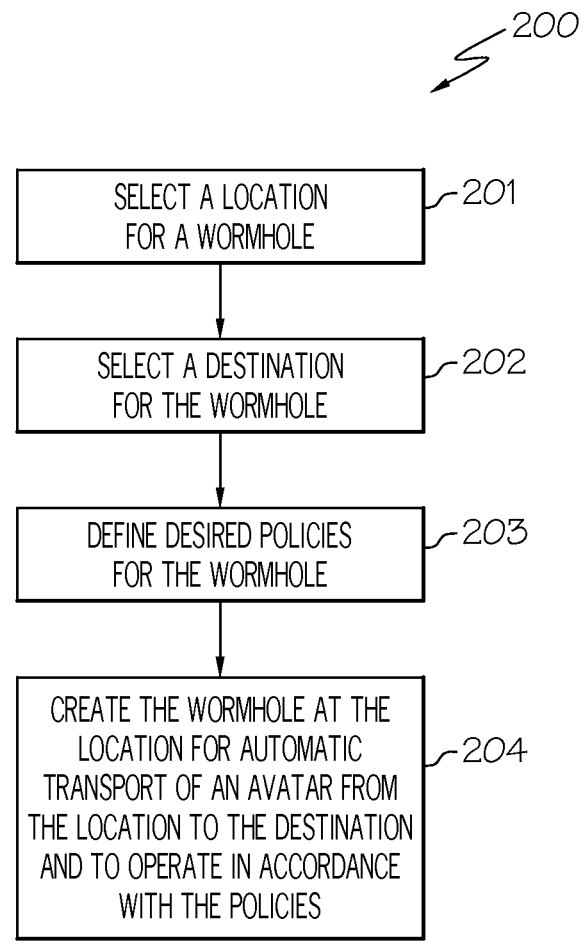
FIG. 2 is a flowchart of a process for a three-dimensional virtual world wormhole according to an example embodiment of the present invention.

FIG. 2 shows a flowchart of a process for a three-dimensional virtual world wormhole according to an example embodiment of the present invention. In the process 200, in block 201, the location for a wormhole may be selected. In block 202, a destination for the wormhole may be selected. In block 203, desired policies for the wormhole may be defined. In block 204, the wormhole may be created at the location for automatic transport of an avatar from the location to the destination and to operate in accordance with the defined policies.

Figure 3:
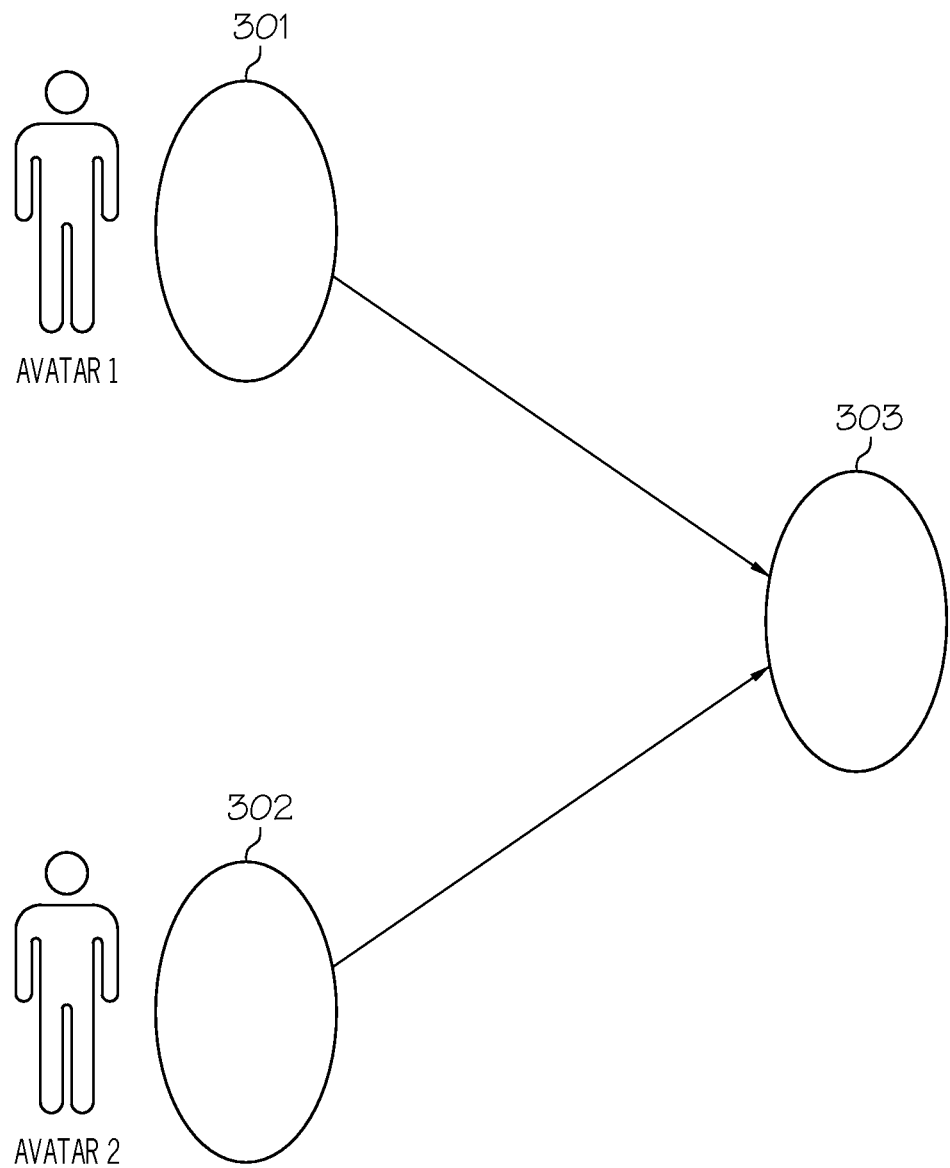
FIG. 3 is a diagram of multiple wormholes connected to a single destination according to an example embodiment of the present invention.

FIG. 3 shows a diagram of multiple wormholes connected to a single destination according to an example embodiment of the present invention. According to embodiments of the present invention, more than one wormhole 301, 302 may be created in a virtual world where each wormhole 301, 302 is connected to the same destination. For example, a wormhole 301 may be created at one location in a virtual world whereby when an avatar enters the wormhole 301, the avatar may be transported to a destination 303. Similarly, a second avatar may enter a different second wormhole 302 at a different location in the virtual world and be transported to the same destination 303. This embodiment may be advantageous for a retail establishment that establishes multiple wormholes throughout a virtual world where avatars entering any of the wormholes may be automatically transferred to a store front of the retail establishment.

Figure 4:
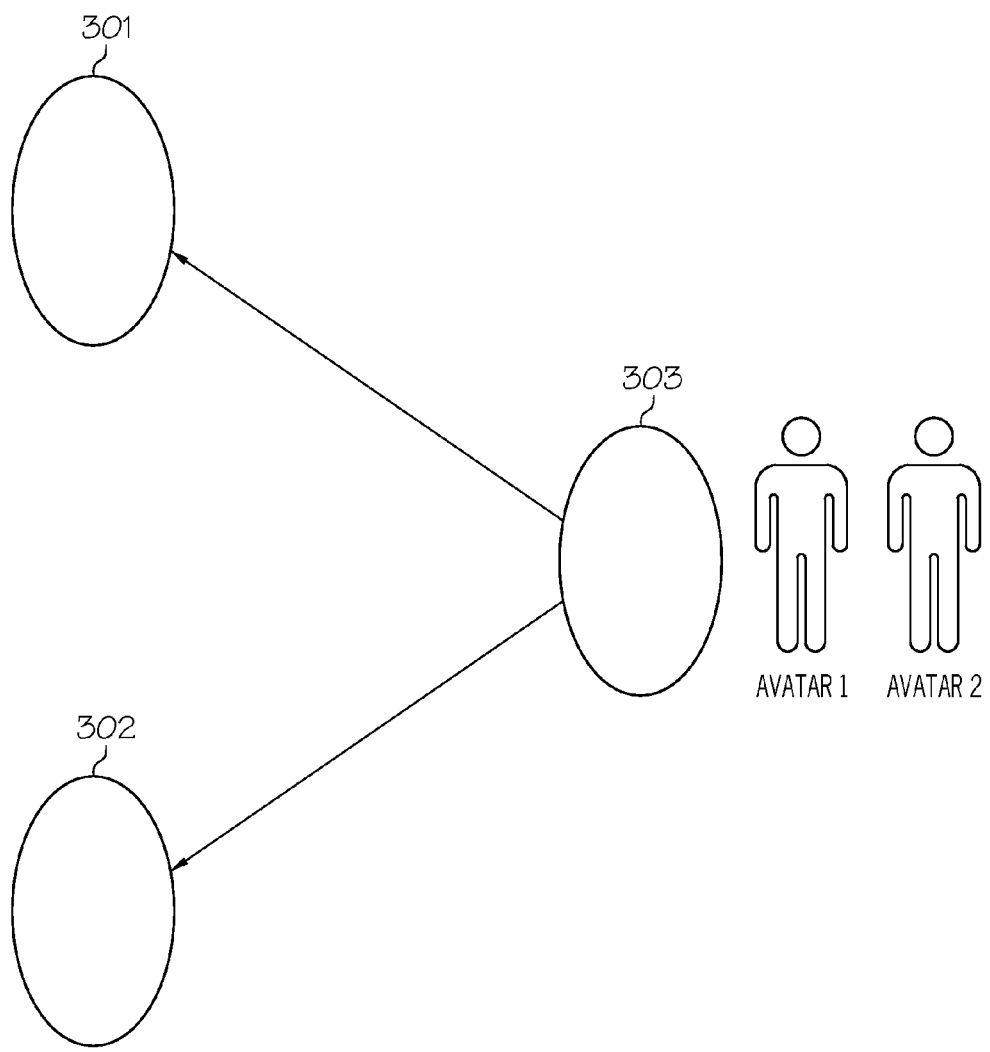
FIG. 4 is a diagram of transporting avatars from a destination to their original entry point according to an example embodiment of the present invention.

FIG. 4 shows a diagram of transporting avatars from a destination to their original entry point according to an example embodiment of the present invention. A first avatar may desire to leave a wormhole destination 303 and may be automatically transported back to a location 301 of the wormhole where the first avatar entered. Similarly, a second avatar at the wormhole destination 303 may desire to leave the destination and may be automatically transported back to a second location of a second wormhole 302 where the second avatar entered to get to the destination 303. Therefore, according to embodiments of the present invention, an original source wormhole location for each avatar at a common destination of the source wormholes may be tracked in order to transport each avatar back to the avatar's original wormhole entry point. A management/policy system may be used to manage which avatars came from what location in order to know how to route each avatar back to the appropriate source location.

Figure 5:
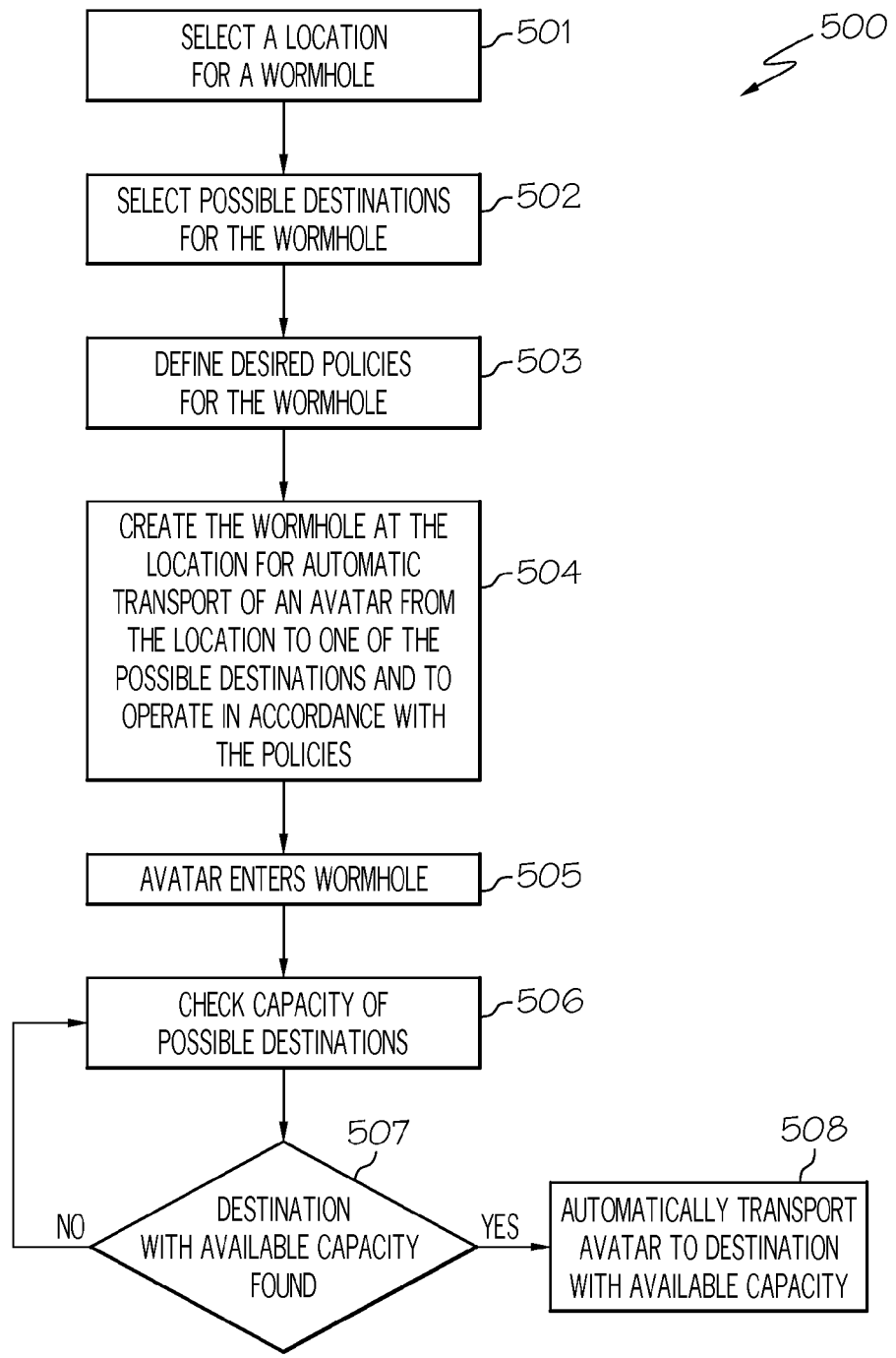
FIG. 5 is a flowchart of a process for a three-dimensional virtual world wormhole having multiple possible destinations according to an example embodiment of the present invention.

FIG. 5 shows a flowchart of a process for a three-dimensional virtual world wormhole having multiple possible destinations according to an example embodiment of the present invention. In the process 500, in block 501, a location for a wormhole may be selected. In block 502, possible destinations for the wormhole may be selected. In block 503, desired policies for the wormhole may be defined. In block 504, a wormhole may be created at the location for automatic transport of an avatar from the location to one of the possible destinations. The created wormhole is created to operate in accordance with the desired policies. In block 505, an avatar may enter the wormhole. In block 506, a capacity of each of the possible destinations of the wormhole may be checked. In block 507, it may be determined if any of the possible destinations have available capacity and if not the process moves back to block 506 to continue checking the capacity of possible destinations. If a destination with available capacity is found, then in block 508, the avatar may be automatically transported to the destination with the available capacity. Therefore, according to embodiments of the present invention, a wormhole may be created with multiple possible destinations where a system may perform load balancing to determine which of the possible destinations an avatar entering the wormhole may be transported to. Each possible destination may have a defined maximum avatar capacity. Therefore, an avatar entering the wormhole may only be transported to a destination with available capacity.

Figure 6:
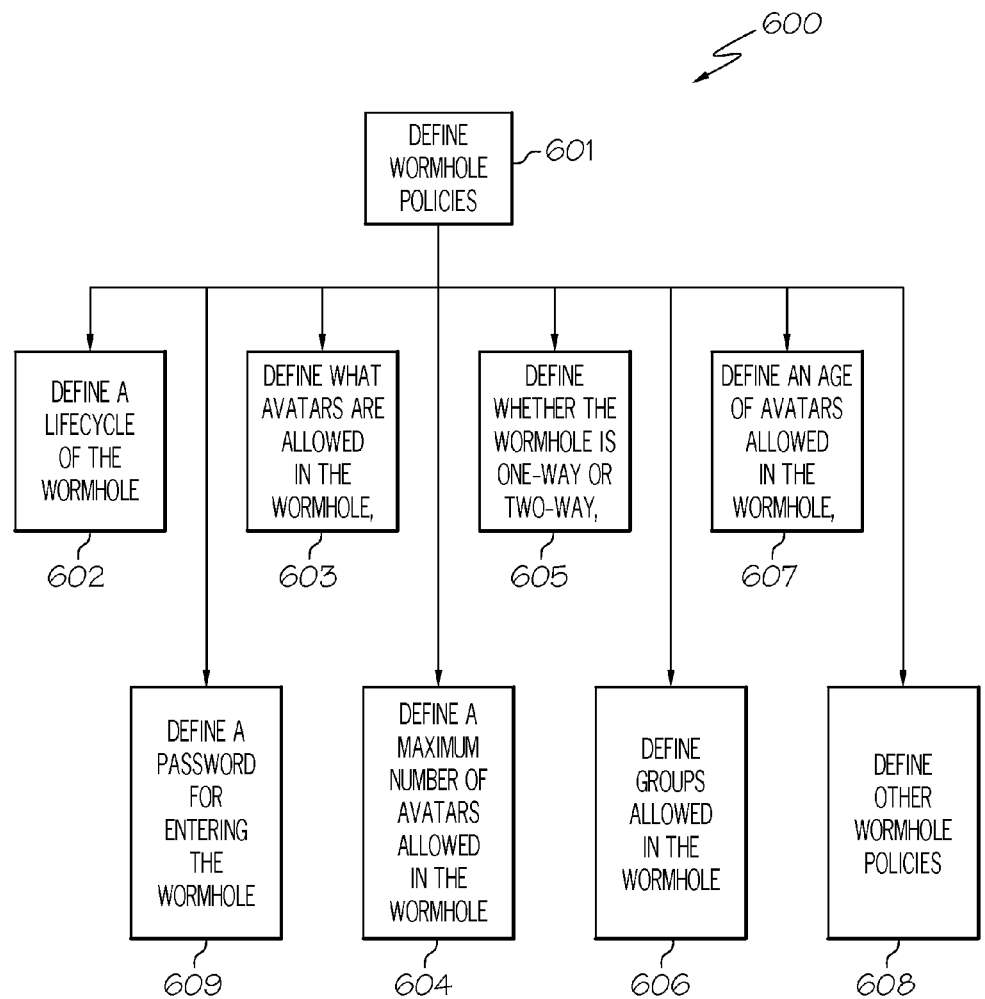
FIG. 6 is a flowchart of a process for defining policies for a created wormhole according to an example embodiment of the present invention.

FIG. 6 shows a flowchart of a process for defining policies for a created wormhole according to an example embodiment of the present invention. In the process 600, in block 601 policies for a created wormhole may be defined. Any of many types of policies may be defined. For example, in block 602 a lifecycle of the wormhole may be defined, in block 609 a password for entering the wormhole may be defined, in block 603 which avatars are allowed to enter the wormhole may be defined, in block 604 a maximum number of avatars allowed in the wormhole may be defined, in block 605 whether the wormhole is a one-way or a two-way wormhole may be defined, in block 606 what group of avatars are allowed to enter the wormhole may be defined, in block 607 an age of avatars allowed in the wormhole may be defined, or in block 608 other wormhole policies may be defined, etc. The wormhole may only allowed avatars to enter the wormhole in accordance with the defined policies of the wormhole.

Figure 7:
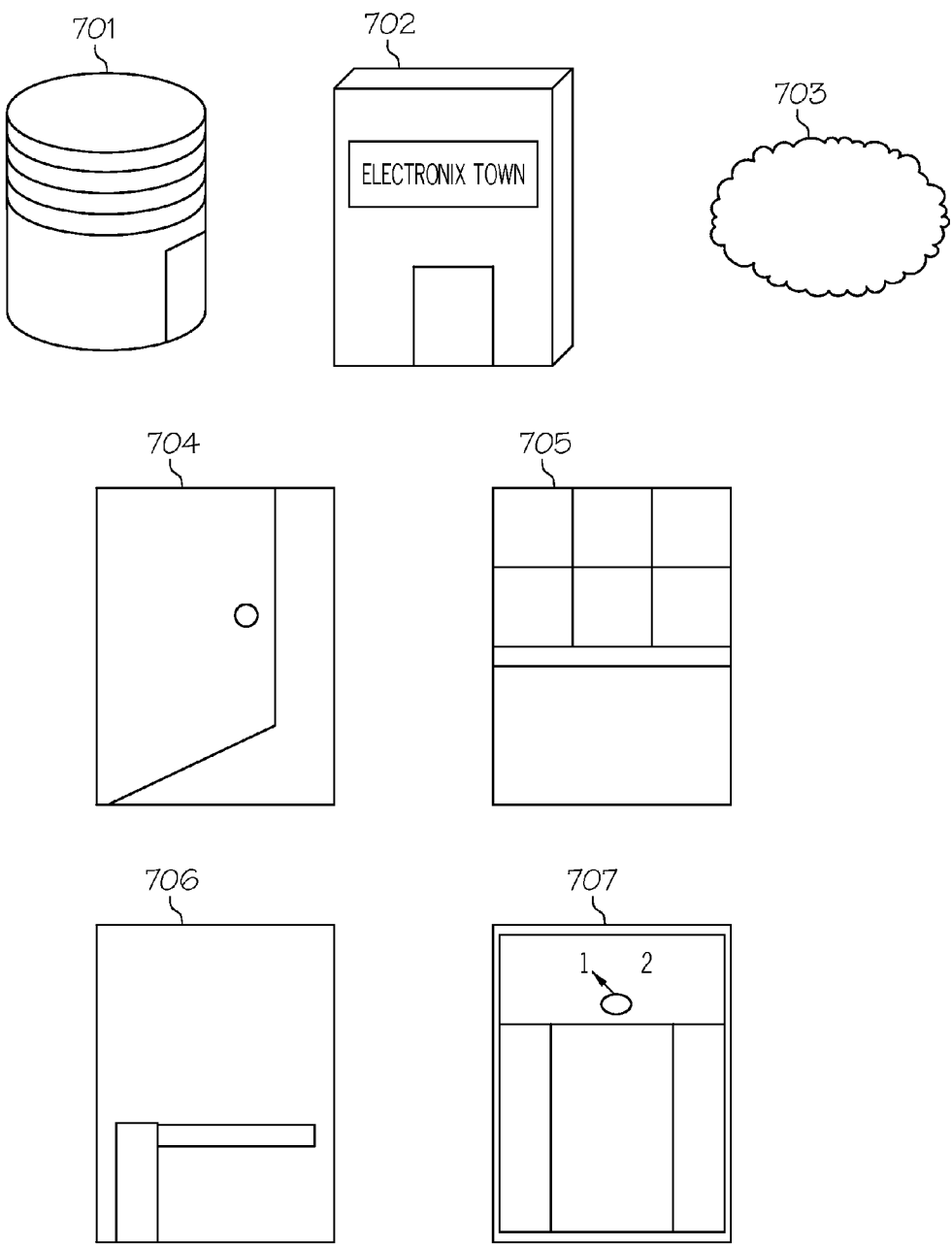
FIG. 7 is a diagram of wormhole shapes according to example embodiments of the present invention.

FIG. 7 shows a diagram of wormhole shapes according to example embodiments of the present invention. According to embodiments of the present invention, a wormhole may be created in any of various types of shapes, sizes and forms. For example, a wormhole may be created in a cylindrical shape 701, as a store front with a store front logo or sign 702, as a cloud 703, as a doorway 704, as a window 705, as a gate 706, as an elevator 707, etc. Once an avatar enters the wormhole the avatar may then be automatically transported to a destination assigned to the wormhole.

Figure 8:
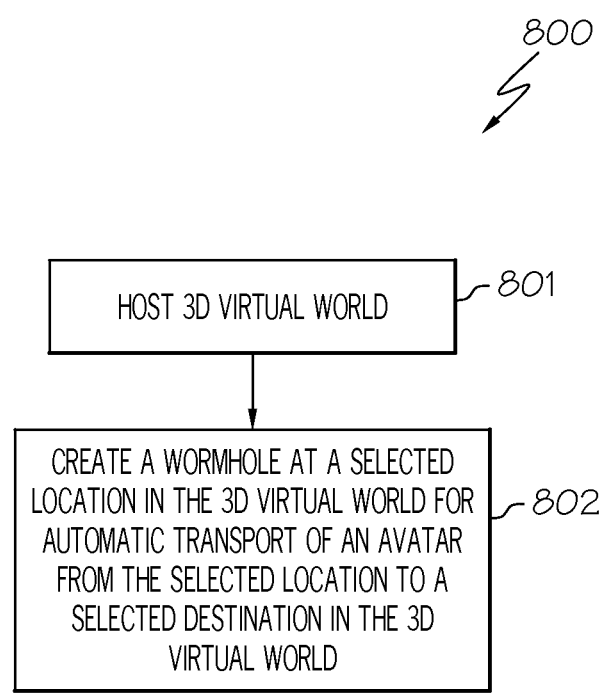
FIG. 8 is a flowchart of a process for a three-dimensional virtual world wormhole according to another example embodiment of the present invention.

FIG. 8 is a flowchart of a process for a three-dimensional virtual world wormhole according to another example embodiment of the present invention. In the process 800 in block 801 a three-dimensional (3D) virtual world may be hosted. In block 802 a wormhole may be created at a selected location in the 3D virtual world for automatic transport of an avatar from the selected location to a selected destination in the 3D virtual world. The process 800 may be performed by or operate on a server.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A method for a three dimensional (3D) virtual world wormhole comprising:
   hosting, by a server computer, a 3D virtual world;
   creating, by the server computer, a wormhole at a selected location in the 3D virtual world for automatic transport of an avatar from the selected location to a selected destination in the 3D virtual world;
   checking, by the server computer, a capacity of the selected destination in response to an avatar entering the wormhole and prior to transporting the avatar to the selected destination;
   checking, by the server computer, capacities of other possible destinations in response to the selected destination being full;
   continuing checking, by the server computer, the capacities of the selected destination and the other possible destinations until the selected destination or one of the other possible destinations has an available capacity; and
   transporting the avatar, by the server computer, to the selected destination or the one of the other possible destinations that has the available capacity.

2. The method according to claim 1, further comprising defining a policy for the wormhole.

3. The method according to claim 2, wherein the defining a policy for the wormhole comprises at least one of: defining a lifecycle of the wormhole; defining what avatars are allowed in the wormhole; defining whether the wormhole is one-way or two-way; defining a password for entering the wormhole; defining a maximum number of avatars allowed in the wormhole; defining an age of avatars allowed in the wormhole; and defining groups allowed in the wormhole.

4. The method according to claim 2, wherein defining a policy for the wormhole further comprises defining the policy for the wormhole by the avatar that created the wormhole.

5. The method according to claim 2, wherein the defining a policy for the wormhole comprises defining a lifecycle of the wormhole.

6. The method according to claim 2, wherein the defining a policy for the wormhole comprises defining what avatars are allowed in the wormhole.

7. The method according to claim 2, wherein the defining a policy for the wormhole comprises defining whether the wormhole is one-way or two-way.

8. The method according to claim 2, wherein the defining a policy for the wormhole comprises defining an age of avatars allowed in the wormhole; and defining groups allowed in the wormhole.

9. The method according to claim 1, further comprising creating a second wormhole at a second selected location in the 3D virtual world for automatic transport of a second avatar from the second location to the destination.

10. The method according to claim 9, further comprising returning the avatar that entered the wormhole at the location from the destination back to the location and returning the second avatar that entered the wormhole at the second location from the destination back to the second location.

11. The method according to claim 1, further comprising displaying a map for selecting the destination.

12. The method according to claim 1, further comprising providing a business sign at the wormhole, the destination of the wormhole being a store identified by the business sign.

13. The method according to claim 1, wherein the wormhole is in the form of a shape comprising one of a store front, a door, a window, a gate, and an elevator.

14. The method according to claim 1, wherein creating a wormhole at the location for automatic transport of an avatar from the location to the destination further comprises creating the wormhole for transport to any one of a plurality of destinations based on a current capacity of each of the plurality of destinations.

15. A system for a three dimensional (3D) virtual world wormhole comprising:
   a server; and
   a network interface that couples the server to a workstation, wherein the server hosts a virtual world allowing a user at the workstation to control an avatar in the virtual world to select a location in the virtual world, select a destination in the virtual world, and create a wormhole at the location for automatic transport of the avatar from the location to the selected destination;
   a module to check a capacity of the selected destination in response to a user's avatar entering the wormhole and prior to transporting the user's avatar to the selected destination;
   another module to check capacities of other possible destinations in response to the selected destination being full, the other module continuing to check the capacities of the selected destination and the other possible destinations until the selected destination or one of the other possible destinations has an available capacity; and
   a module to transport the avatar to the selected destination or the one of the other possible destinations that has the available capacity.

16. The system according to claim 15, wherein the server allows the user to define a policy for the wormhole.

17. The system according to claim 16, wherein the policy comprises at least one of a lifecycle of the wormhole, what avatars are allowed in the wormhole, whether the wormhole is one-way or two-way, a password for entering the wormhole, a maximum number of avatars allowed in the wormhole, an age of avatars allowed in the wormhole, and groups allowed in the wormhole.

18. The system according to claim 15, wherein the server provides a business sign at the wormhole, the destination of the wormhole being a store identified by the business sign.

19. The system according to claim 15, wherein the server creates the wormhole so as to allow the transport of the avatar from the location to one of a plurality of destinations based on a current capacity of each of the plurality of destinations.

20. The system according to claim 15, wherein the server allows the user to select a second location and create a second wormhole at the second location for automatic transport of the avatar from the second location to the destination.

21. A computer program product comprising a non-transitory computer readable storage medium having computer useable program code embodied therewith, the computer useable program code comprising:
   computer useable program code configured to run a three-dimensional (3D) virtual world;
   computer useable program code configured to create a wormhole at a selected location in the 3D virtual world for automatic transport of an avatar from the location to a selected destination in the 3D virtual world;
   computer useable program code configured to check a capacity of the selected destination in response to an avatar entering the wormhole and prior to transporting the avatar to the selected destination; and
   computer useable program code configured to check capacities of other possible destinations in response to the selected destination being full;
   computer useable program code to continue checking the capacities of the selected destination and the other possible destinations until the selected destination or one of the other possible destinations has an available capacity; and computer useable program code to transport the avatar to the selected destination or the one of the other possible destinations that has the available capacity.

22. The computer program product according to claim 21, further comprising computer useable program code configured to define policies for the wormhole.

23. The computer program product according to claim 21, further comprising computer useable program code configured to provide a business sign at the wormhole, the destination of the wormhole being a store identified by the business sign.

24. The computer program product according to claim 21, further comprising computer useable program code configured to create the wormhole at the location for automatic transport of the avatar from the location to any one of a plurality of destinations based on a current capacity of each of the plurality of destinations.

* * * * *